(12) United States Patent
Moore

(10) Patent No.: US 7,565,885 B2
(45) Date of Patent: Jul. 28, 2009

(54) CONTROL OF ANIMAL CONTAINMENT SYSTEM TRANSMITTER SETTINGS WITH MINIMAL SWITCHES

(75) Inventor: William P. Moore, Fort Wayne, IN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 11/442,855

(22) Filed: May 30, 2006

(65) Prior Publication Data

US 2007/0289554 A1 Dec. 20, 2007

(51) Int. Cl.
*A01K 15/04* (2006.01)
(52) U.S. Cl. .................... 119/721; 119/720
(58) Field of Classification Search ............ 119/712, 119/719, 720, 721, 856, 857, 859, 908; 340/573.3, 340/573.1
See application file for complete search history.

(56) References Cited

U.S. PATENT DOCUMENTS

| | | | |
|---|---|---|---|
| 4,205,354 A | 5/1980 | Kramer | 360/72.1 |
| 4,578,640 A | 3/1986 | Crooke et al. | 324/115 |
| 6,072,535 A | 6/2000 | Kearns | 348/563 |
| 6,130,513 A | 10/2000 | Orton | 318/16 |
| 6,166,643 A * | 12/2000 | Janning et al. | 340/573.3 |
| 6,587,067 B2 | 7/2003 | Darbee et al. | 341/176 |
| 6,598,563 B2 * | 7/2003 | Kim et al. | 119/720 |
| 6,671,351 B2 | 12/2003 | Menard et al. | 379/45 |
| 6,990,317 B2 | 1/2006 | Arnold | 455/59 |
| 2004/0140907 A1 | 7/2004 | Morin, II et al. | 340/825.72 |
| 2005/0208894 A1 | 9/2005 | Conner et al. | 455/41.2 |
| 2006/0112901 A1 * | 6/2006 | Gomez | 119/721 |

* cited by examiner

*Primary Examiner*—T. Nguyen
(74) *Attorney, Agent, or Firm*—Pitts & Brittian, P.C.

(57) ABSTRACT

A transmitter for an animal training system, which includes a modulator for energizing at least one antenna, and a controller connected to the modulator. A first switch is connected to the controller, and the first switch is for entering a setup mode and for selecting at least one of a plurality of setting configurations. A second switch is also connected to the controller, and the second switch is for modifying a value of a respective setting configuration.

9 Claims, 6 Drawing Sheets

CONTROL OF ANIMAL CONTAINMENT SYSTEM TRANSMITTER SETTINGS WITH MINIMAL SWITCHES

BACKGROUND OF THE INVENTION

1. Field of the Invention

The present invention relates to animal training systems, and, more particularly, to transmitters for animal containment systems.

2. Description of the Related Art

Animal training systems are known for containing a pet dog, or other animals, within a defined region without the need for a physical barrier such as a fence. An example of such a system includes a wire loop buried around the perimeter of an area, which has the two wire ends energized by a transmitter power source. The animal has a collar with a receiver which senses the signal radiated by the wire loop and provides a correction signal to the animal when the animal is within a predetermined relatively short range of the wire loop. The correction signal can be a tone, a vibration, and/or an electrical stimulation, for example. The animal learns to avoid the correction signal by staying within a perimeter defined by the wire loop signal, and the need to fence the area to contain the animal is thereby eliminated. Animal training systems also include avoidance systems which have a transmitter which emits a signal, and when a dog wearing an appropriate receiver, for example, is within a predetermined distance of the transmitter the receiver provides a stimulus to the animal thereby training the animal to avoid the nearby vicinity of the transmitter. Avoidance and containment systems can be integrated so that a single receiver can receive both avoidance and containment signals.

Examples of other animal training systems include a remote training transmitter hand operated by a human trainer, and which communicates with an animal worn receiver to provide training stimulus. Bark control collars are also known where a collar worn receiver may receive audio or vibration signals from a microphone or transducer attached or connected to the receiver unit or the collar, and provides appropriate training stimulus to reduce barking.

Various wire loop containment systems for controlling the whereabouts of animals are known where one or more continuous wire loops are routed along a path to define a boundary. In some cases the wires are run above ground, in others they are buried. Also, a containment loop can be installed indoor, and there may need to be a difference in the correction signal emitted by the outdoor loop versus the indoor loop, as there may be more serious consequences to the animal for leaving the outdoor containment area, or vice versa. A transmitter connected directly to the loop typically generates an amplitude modulated (AM) signal which is conducted by the loop and causes an AM radio signal to radiate from the loop at a predetermined carrier frequency which is typically in the range of about 2 kHz to about 20 kHz, and signals can be coded using on/off keying. A frequency of the signal can be selectable at the transmitter for each loop, and other transmitter functionality can be selectable.

The transmitter functionality needs to be configured for appropriate operation of the containment system. One way to configure the operation is to have a switch for each of the different functional categories, which switch can select the appropriate value for that particular category. This type of system has several disadvantages. Firstly, as the number of features and functions grow, the number of switches also has to grow, which can be costly and aesthetically unattractive. Another problem is that there may not be enough room within the transmitter or on the transmitter circuit board for a switch for each functional category, particularly as the number of system features and functions grow. Further, as the number of components increases, i.e., the number of switches increases, the reliability of the system tends to decrease. Yet further, adding a switch for each additional feature and/or function requires design changes to the transmitter, which are costly and time consuming.

What is needed in the art is a transmitter for an animal training system which has a minimal number of switches to configure transmitter functionality, and which switches are adaptable to increasing transmitter functionality.

SUMMARY OF THE INVENTION

The present invention provides an animal training system with a transmitter with a first switch for entering a setup mode and for selecting one of a plurality of setting configurations, and a second switch for modifying a value of a respective setting configuration.

The invention comprises, in one form thereof, a transmitter for an animal training system, which includes a modulator for energizing at least one antenna, and a controller connected to the modulator. A first switch is connected to the controller, and the first switch is for entering a setup mode and for selecting at least one of a plurality of setting configurations. A second switch is also connected to the controller, and the second switch is for modifying a value of a respective setting configuration.

The invention comprises, in another form thereof, an animal training system which includes at least one antenna and a transmitter connected to the at least one antenna. The transmitter includes a modulator for energizing at least one antenna, and a controller connected to the modulator. A first switch is connected to the controller, and the first switch is for entering a setup mode and for selecting at least one of a plurality of setting configurations. A second switch is also connected to the controller, and the second switch is for modifying a value of a respective setting configuration.

The invention comprises, in yet another form thereof, a method of configuring a transmitter for an animal training system, including the steps of: providing the transmitter including a modulator for energizing at least one antenna, a controller connected to the modulator, a first switch connected to the controller, and a second switch connected to the controller; entering a setup mode using the first switch; selecting at least one of a plurality of setting configurations using the first switch; and modifying a value of a respective the setting configuration using the second switch.

An advantage of the present invention is that it can accommodate an increasing number of features and functions of the animal training system without increasing the number of switches.

Another advantage of the present invention is that it can accommodate an increasing number of features and functions of the animal training system without changing the basic design of the transmitter.

Yet another advantage of the present invention is that it can accommodate an increasing number of features and functions of the animal training system without changing the transmitter circuit board.

Yet another advantage of the present invention is that it provides a higher reliability.

Yet another advantage of the present invention is that it provides a relatively low component cost.

Yet another advantage of the present invention is a more aesthetically attractive appearance.

Yet another advantage of the present invention is a "high-tech" look.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
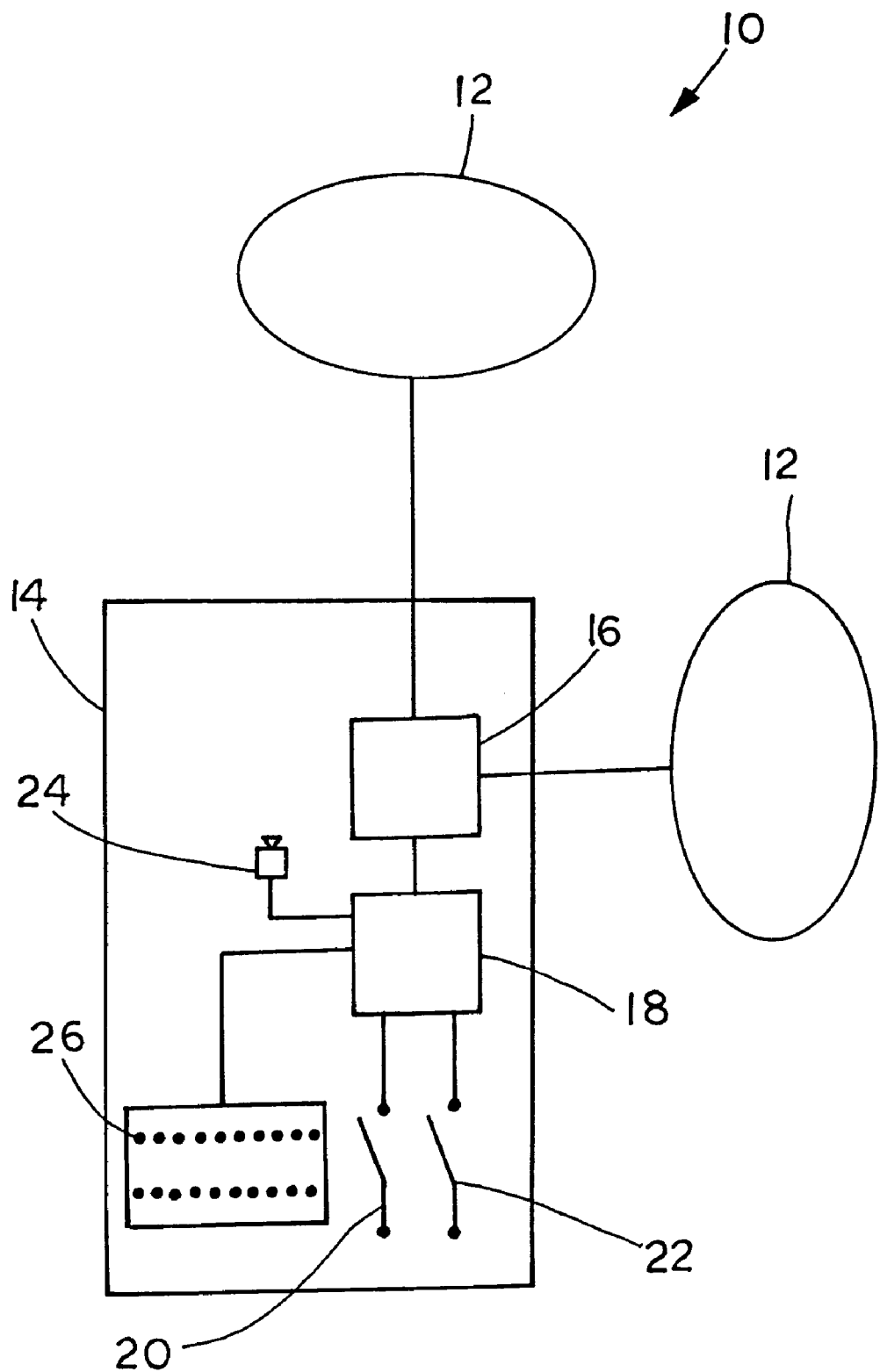
FIG. 1 is an electrical schematic view of an embodiment of an animal training system according to the present invention.

Referring now to the drawings, and more particularly to FIG. 1, there is shown an animal training system 10, which generally includes at least one antenna 12, and a transmitter 14 connected to antennas 12. Transmitter 14 includes a modulator 16 for energizing antenna 12, a controller 18 connected to modulator 16, a first switch 20 connected to controller 18, which can be a momentary pushbutton for example, and a second switch 22 connected to controller 18 which also can be a momentary pushbutton, for example. An enunciator 24, such as piezo-electric device, can be connected to controller 18 to provide a chirp for feedback to a user whenever one of switches 20, 22 are pressed. Indicator lights 26 can provide visual feedback for a user when using switches 20, 22 to select settings for transmitter 14. The common terminal of switches 20, 22 can be connected to a ground or voltage source, for example.

Figure 2:
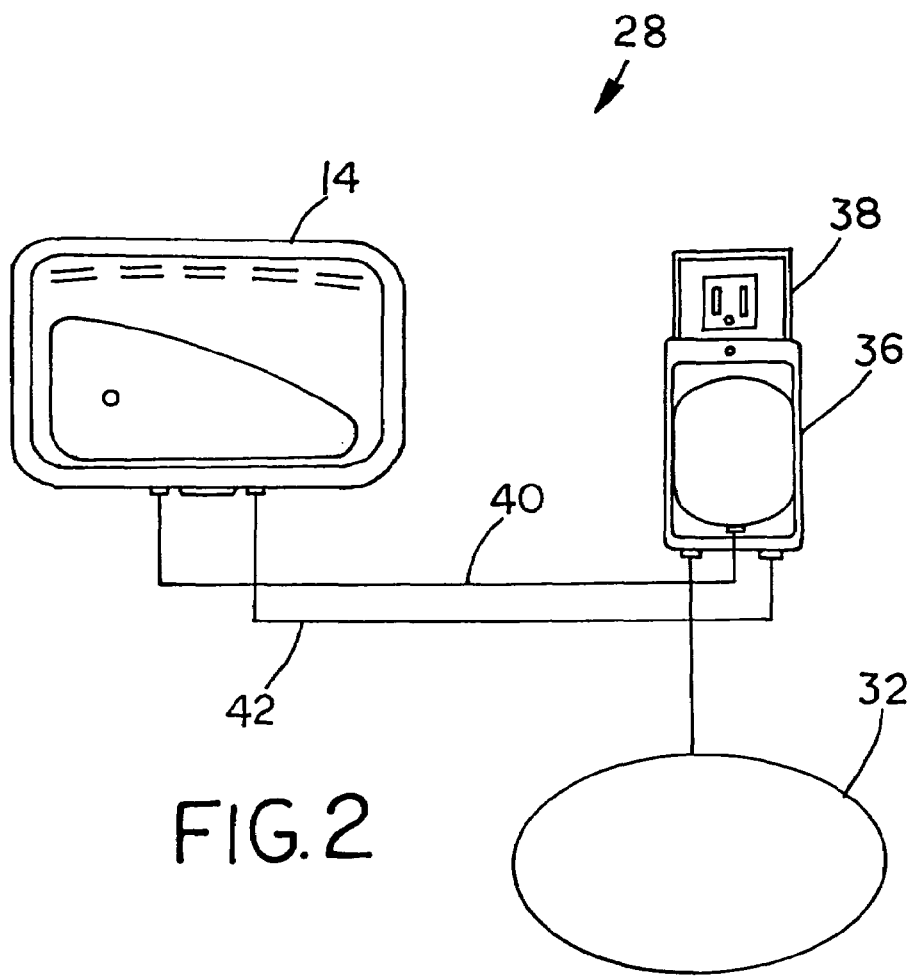
FIG. 2 is an electrical schematic view similar to the embodiment of FIG. 1, showing particularly some installation details and showing connection to a single antenna.
Figure 3:
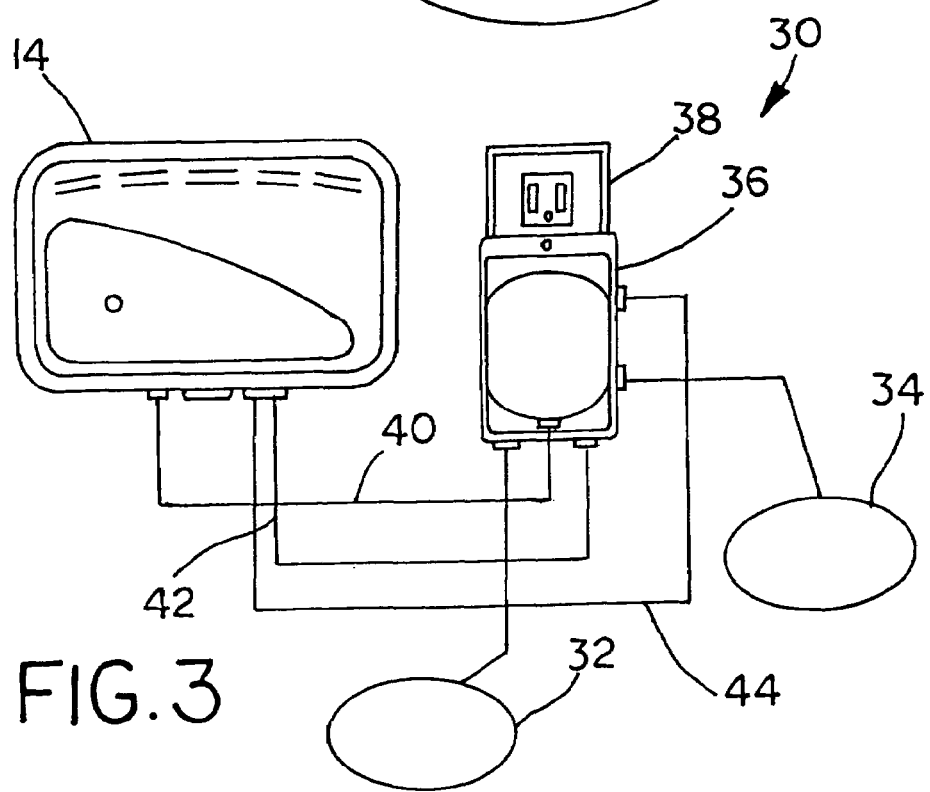
FIG. 3 is an electrical schematic view of the embodiment of FIG. 1, showing particularly some installation details and showing connection to two antennas.

FIGS. 2 and 3 illustrate embodiments of installations of animal training system 10 as animal containment systems 28, 30, respectively, and which are single containment loop and dual containment loop systems, respectively. In such systems, antenna(s) 12 are in the form of a containment wire loop such as a first containment wire loop 32 and a second containment wire loop 34. In these installations, a lightning/surge protector 36 is connected to an electrical power receptacle 38. Transmitter 14 receives power from lightning/surge protector 36 through power cord 40. Signal lines 42, 44 provide appropriate signals to respective containment wire loops 32, 34, or other antennas, via lightning/surge protector 36.

Figure 4:
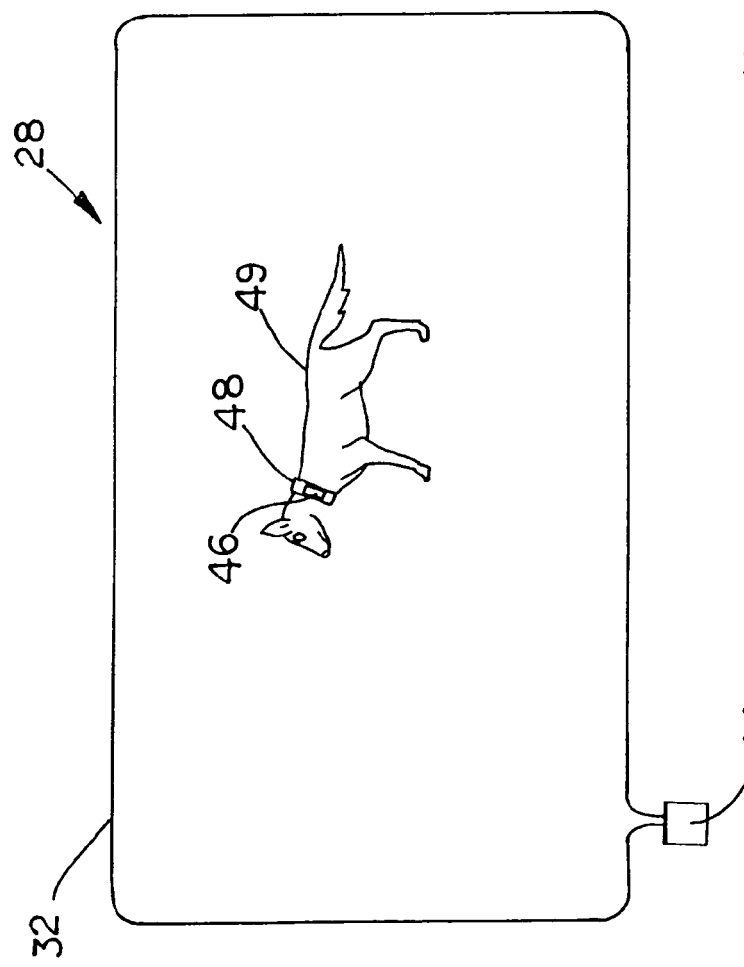
FIG. 4 is a schematic view of a containment type animal training system according to the present invention.
Figure 5:
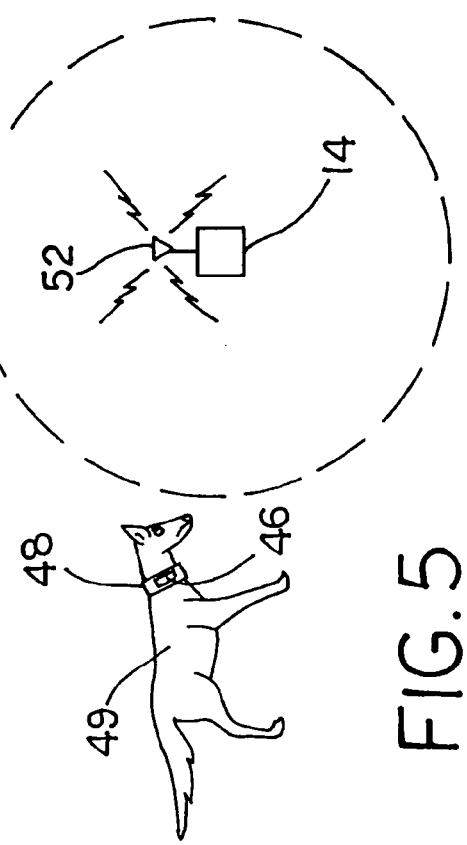
FIG. 5 is a schematic view of an avoidance type animal training system according to the present invention.
Figure 6:
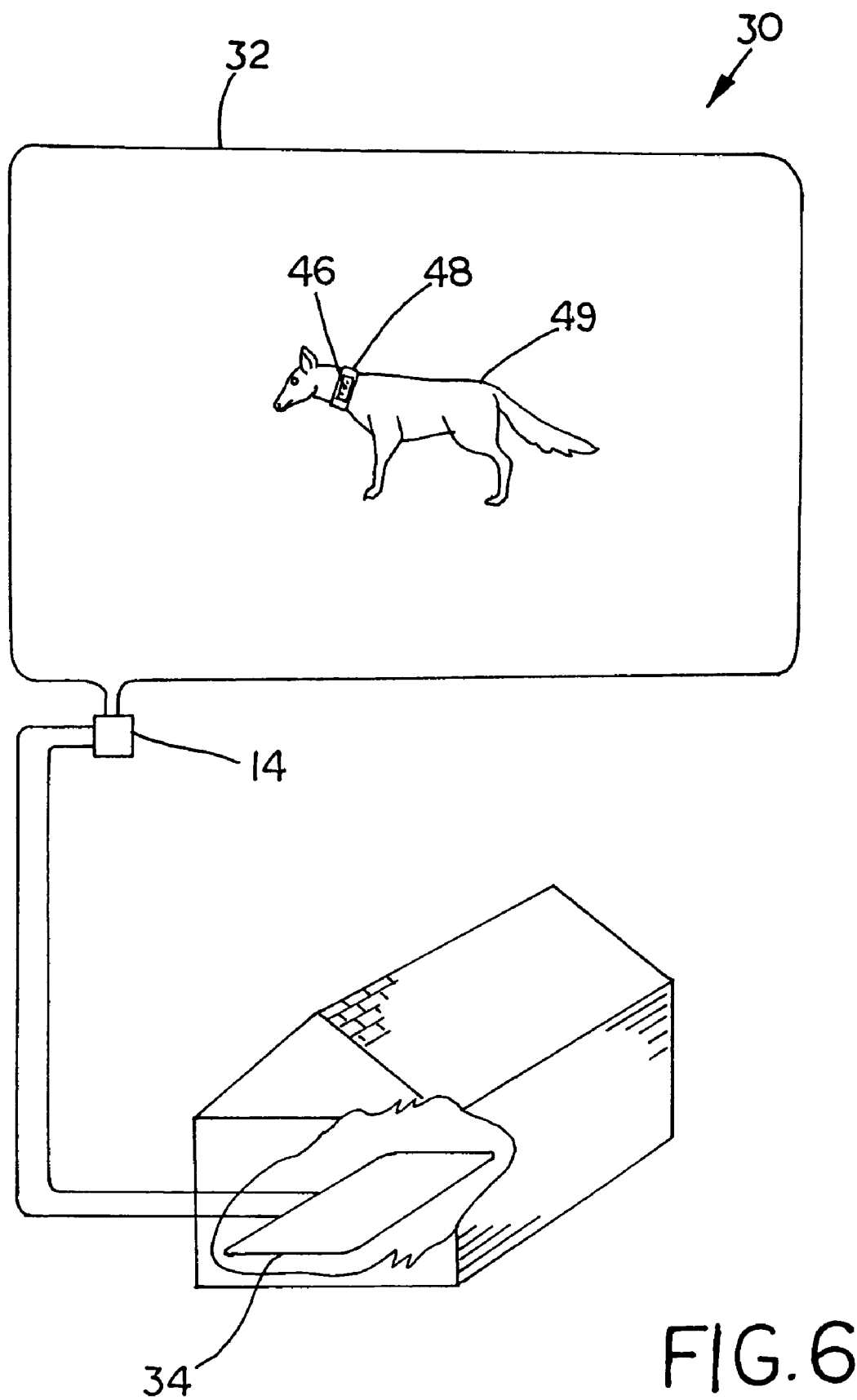
FIG. 6 is a schematic view of a containment type animal training system which includes two containment areas, one outdoor and one indoor according to the present invention.

As illustrated in FIGS. 4-6, the animal training systems of the present invention can include a receiver 46 in wireless communication with transmitter 14. Receiver 46 can be connected to collar 48 which is worn by an animal 49, for example, although other configurations are possible. Receiver 46 can include a receiver antenna to receive a transmitted signal (from transmitter 14 through antenna 12), where the antenna is connected to a demodulator which is connected to a receiver controller. Depending on the transmitted/received signal, the receiver controller can actuate an electrical stimulus switch which is connected to the controller, and which electrical stimulus switch in turn energizes a transformer and electrodes which are in contact with the animals neck. The controller can further be connected to, and can actuate a tone switch which is connected to and activates an enunciator; and/or a vibration switch which is connected to and activates a vibrational element.

Transmitter 14 can be configured in a single containment loop system 28 (FIG. 4), an avoidance type animal training system 50 (FIG. 5), a multiple containment loop system 30 (FIG. 6), and/or some combination thereof. Avoidance system 50 includes avoidance type antenna 52, which is typically different than a containment wire loop antenna, and which creates avoidance zone 53. The signals emitted by antennas 12, 32, 34, 50 can include indoor and/or outdoor type signals, where the difference in signal types can include different correction levels, for example. That is, an outdoor signal type may have programmed therewithin a higher correction level as the repercussion of an animal leaving a yard may be greater (wandering into traffic, for example) than the repercussions of an animal leaving a containment area within a building, or entering an avoidance zone in a building, but staying in the building because of physical barriers. The signal radiated by avoidance antenna 52 may be an indoor type signal, as may be the signal radiated by second containment wire loop 32 in FIG. 6, although this is not necessarily the case, and either indoor or outdoor signal types are possible. The indoor or outdoor signals can be digital signals or words created using on/off keying by transmitter 14, and having coded therewithin signal type, correction level, and/or other attributes, for example.

Figure 7:
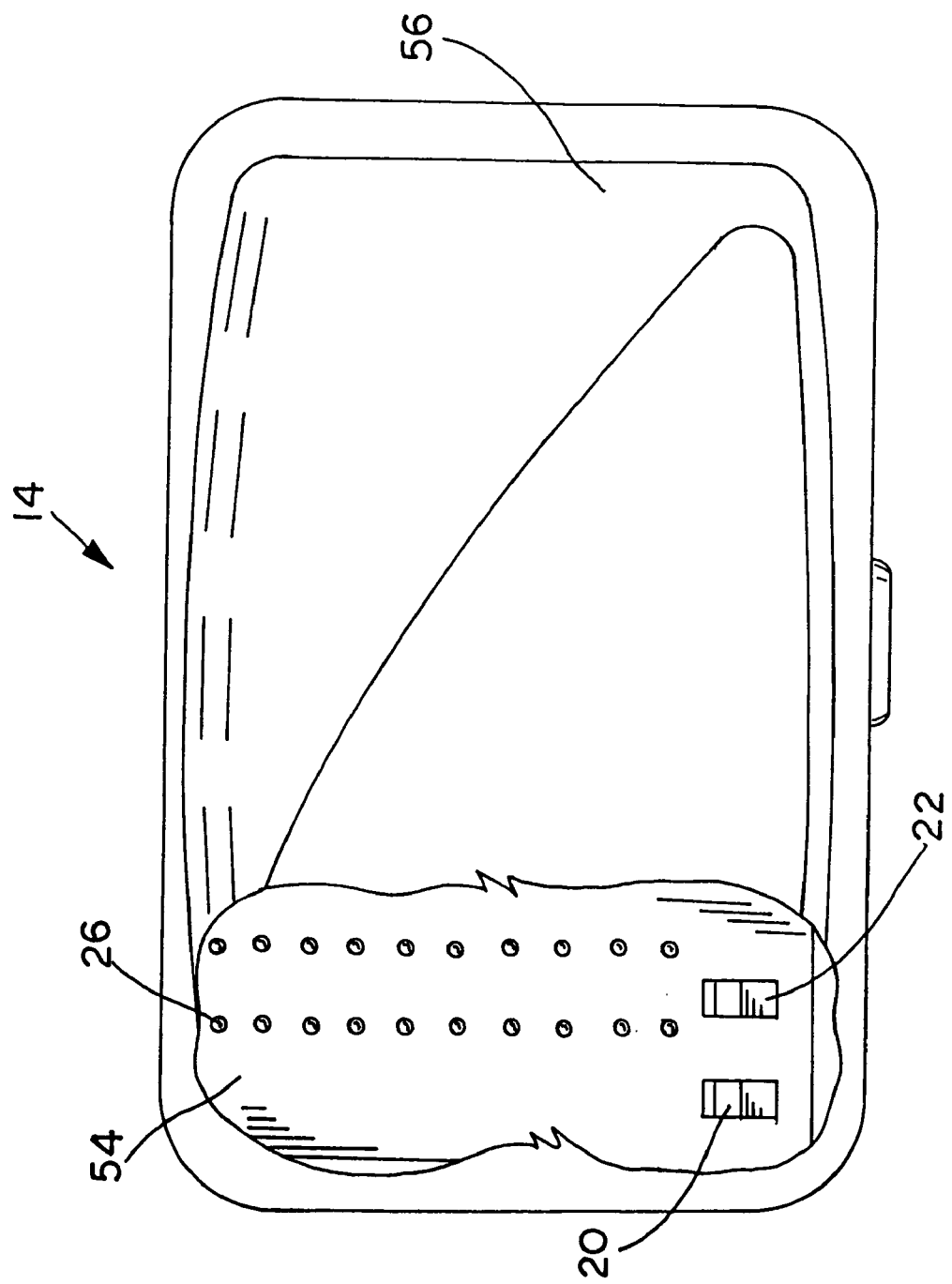
FIG. 7 is a partially fragmentary front view of the transmitter of FIGS. 1-3, showing particularly the setting switches of the present invention.

Switches 20, 22 can be mounted on circuit board 54 (FIG. 7), which is protected by transmitter cover 56, when not being used to select settings for transmitter 14. This type of configuration is advantageous (although not necessary) in that the settings of transmitter 14 cannot be easily inadvertently changed or tampered with. First switch 20 can be for entering a setup mode and for selecting at least one of a plurality of setting configurations. Second switch 22 can be for modifying a value of a respective setting configuration. Examples of setting configurations (and values) include containment loop and/or avoidance zone control (on or off), frequency of the transmitter/antenna(s) signals (7.5 kHz or 10.7 kHz), signal type (indoor or outdoor), mask (mask or transmit boundary signal) and range of the antenna(s) signals (high or low). Fewer or greater setting configurations and values thereof are possible, and within the scope of the present invention, depending on capabilities of the transmitter. In the examples shown in FIG. 7, the twenty indicator lights 26 can accommodate two antennas each having the five setting configurations and values discussed previously (two containment loops and/or avoidance zones×five configuration settings/antenna× two values/configuration setting=twenty indicator lights).

Figure 8:
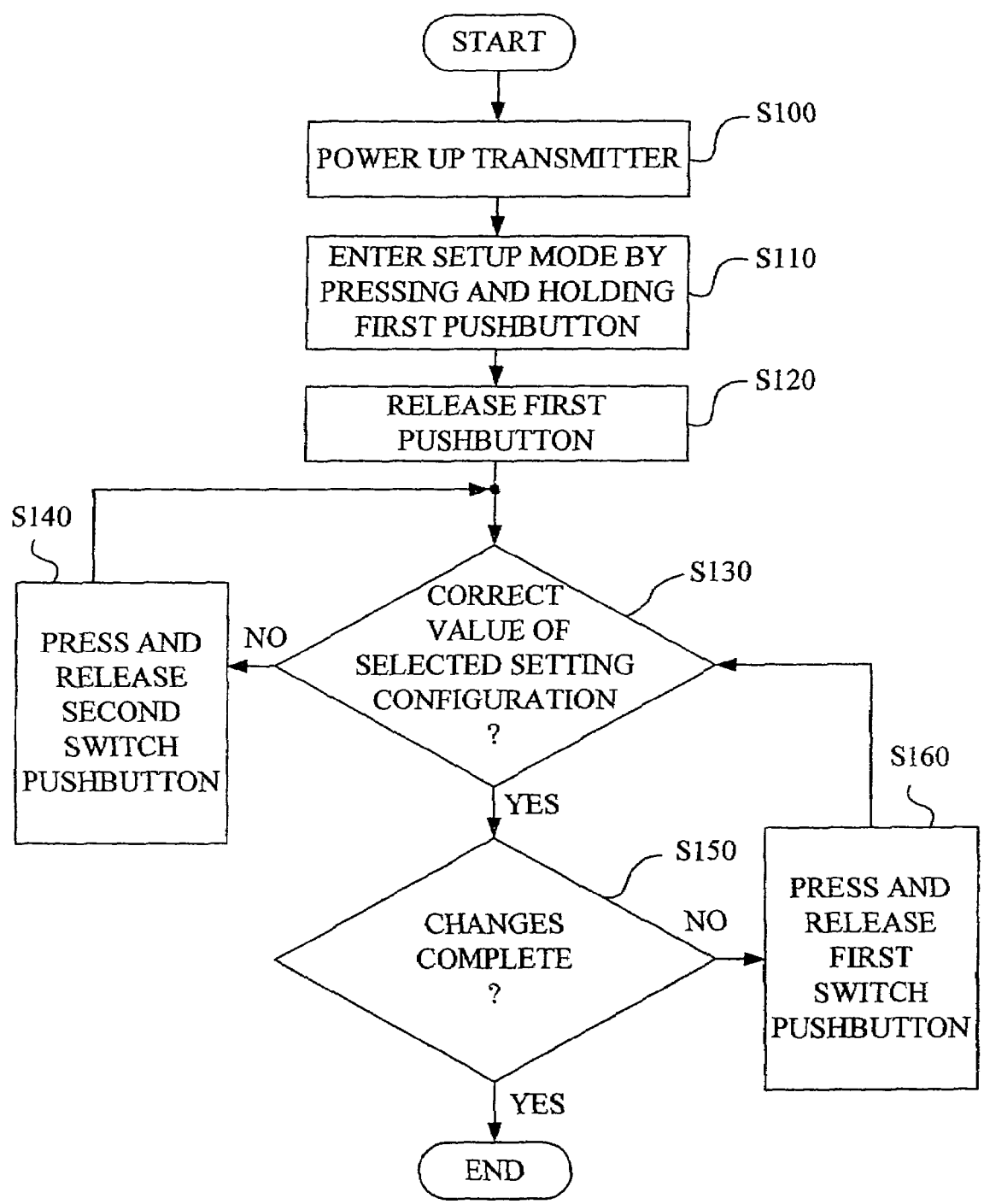
FIG. 8 is a flowchart of an embodiment of the method according to the present invention.

In use, the present invention discloses a method (FIG. 8) of configuring a transmitter 14 for an animal training system, including the steps of: providing transmitter 14 including a modulator 16 for energizing at least one antenna 12, a controller 18 connected to modulator 16, a first switch 20 connected to controller 18, and a second switch 22 connected to controller 18; entering (S110) a setup mode using first switch 20; selecting (S140) at least one of a plurality of setting configurations using first switch 20; and modifying (S150 and S160) a value of a respective said setting configuration using second switch 22. The entering step can include the substeps of pressing and holding first switch 20. The method can further include the step of determining (S130) if the setting configuration has a correct value.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An animal training system, comprising:
   at least one antenna;
   a transmitter connected to said at least one antenna, said transmitter including:
      a modulator for energizing said at least one antenna;
      a controller connected to said modulator;
      a first switch connected to said controller, said first switch for selecting at least one of a plurality of setting configurations, each of said plurality of setting configurations correlating to one of a plurality of parameters of said training system whereby said first switch is provided for selecting one of said plurality of parameters to modify; and
      a second switch connected to said controller, said second switch for modifying a value of one of said plurality of parameters selected by said first switch.

2. The animal training system of claim 1, wherein said animal training system is an animal containment system.

3. The animal training system of claim 2, wherein said antenna is a containment wire loop.

4. The animal training system of claim 2, wherein said at least one antenna includes a first containment wire loop and a second containment wire loop.

5. The animal training system of claim 1, wherein said plurality of setting configurations includes at least one of loop control, frequency, signal type, mask and range.

6. The animal training system of claim 5, wherein said plurality of setting configurations includes said frequency setting configuration.

7. The animal training system of claim 6, wherein said frequency setting configuration includes said value of approximately one of 7.5 kHz and 10.7 kHz.

8. The animal training system of claim 1, further including a receiver in wireless communication with said transmitter.

9. The animal training system of claim 8, further including a collar connected to said receiver.

* * * * *